US006712758B1

(12) United States Patent  
Campbell

(10) Patent No.: US 6,712,758 B1
(45) Date of Patent: Mar. 30, 2004

(54) GROUNDING SYSTEM FOR A FIBERSCOPE

(76) Inventor: Patrick J. Campbell, P.O. Box 23952, Pleasant Hill, CA (US) 95423

( * ) Notice: Subject to any disclaimer, the term of this patent is extended or adjusted under 35 U.S.C. 154(b) by 4 days.

(21) Appl. No.: 10/190,811

(22) Filed: Jul. 3, 2002

(51) Int. Cl.[7] ................................................. A61B 1/00
(52) U.S. Cl. .................... 600/134; 600/139; 385/117
(58) Field of Search ................................ 600/134, 140, 600/139; 385/117

(56) References Cited

U.S. PATENT DOCUMENTS 5,275,152 A * 1/1994 Krauter et al. ............... 600/129
6,319,197 B1 * 11/2001 Tsuji et al. ................... 600/132

FOREIGN PATENT DOCUMENTS

JP 61-277916 * 12/1996 ............... 385/117

* cited by examiner

Primary Examiner—John Mulcahy
(74) Attorney, Agent, or Firm—Theodore J. Bielen, Jr.

(57) ABSTRACT

A grounding system for a fiberscope utilizing an electrically conductive braid surrounding at least a portion of a flexible hollow tube containing fiber optic bundles. The fiberscope also includes an electrically conductive member surrounding the bundle end. The system further possesses connections between the electrically conductive braid and the end member. An electrically conductive ferrule underlies and links the fiberscope housing and the electrically conductive braid. A conductor connects to the ferrule, extending to the exterior portion of the housing for accessibility to the user.

14 Claims, 3 Drawing Sheets

GROUNDING SYSTEM FOR A FIBERSCOPE

BACKGROUND OF THE INVENTION

The present invention relates to a novel and useful grounding system for a fiberscope.

Fiberscopes are often used to view remote areas in edifices, vehicles, and the like. For example, surveillance operations employ fiberscopes to detect contraband in vehicles. Typically, contraband may be hidden in compartments containing volatile hydrocarbons. For example, a gas tank in a vehicle has been known to be used to hide drugs such as heroin, cocaine, and the like. Detection of such illegal substances requires the probe tip of a fiberscope to be placed within the gas tank. Unfortunately, movement of the fiberscope tip relative to the interior of a gas tank may create a spark resulting in an explosion or fire or both. In addition static electricity may be created in other ways. Simply grounding the housing of a fiberscope would not suffice since the fiberscope includes rigid and flexible portions as well as discontinuities along the entire length of the same.

The grounding system for a fiberscope would be a notable advance in the field of surveillance instruments.

BRIEF SUMMARY OF THE INVENTION

In accordance with the present invention a novel and useful grounding system for a fiberscope if herein provided.

The system of the present invention is utilized with a typical fiberscope that includes a relatively rigid, and electrically conductive, housing. A flexible hollow tube extends from the housing and may include a "wrist" joint prior to the image bundle end, which is employed to acquire and image of the space in to which the fiberscope end has been inserted.

The flexible tube enclosing the fiber optic bundle leading to the image-acquiring end utilizes an electrically conductive braid. Such braid material is employed to protect the fiber optic bundle against damage due to abrasion and collision with structures into which the fiberscope is employed. For example, the electrically conductive braid may be formed of electrically conductive materials such as tungsten, stainless steel, and the like.

An electrically conductive member forms a portion of the image bundle end extending from the flexible hollow tube. Such member may be formed into a surrounding structure and is also conductive, commonly being constructed of metallic material. The present invention further includes means for electrically connecting the electrically conductor braid to the electrically conductive member at the end portion of the image bundle. Such means may be in the form of a wrapping or other similar compression structure, since electrically conductive braids are very difficult to connect by soldering.

An electrically conductive ferrule is also employed in the present invention to underlie the housing. The ferrule spans the housing and the electrically conductive braid extending from the end and along the flexible portion of the fiberscope. Means is employed for electrically connecting the electrically conductive braid to the ferrule. Again, due to the peculiarities of the braid, a wrapping or similar structure may be employed to achieve electrical connection between the electrically conductive braid and the ferrule as well as electrical connection between the housing and the ferrule.

Conductors, such as wires are also used in the present invention. Each conductor includes a first end portion connected to the electrically conductive ferrule and a second end portion which leads to the housing for access by the user. The conductor or conductors may be crimped, soldered, or otherwise connected to the ferrule in this regard. The second end portion of the conductor may be electrically linked to a protuberance which extends outwardly from the housing for convenience. Of course, such protuberance may also be slightly recessed into the housing, as the case may be.

Where the fiberscope used with the present invention includes a break in the electrically conductive braid along the flexible tube, a "wrist" portion is formed. To maintain electrical continuity, a sleeve underlies the separated first and second portions of the electrically conductive braid. Again, means is used in the present invention to create an electrical connection between the first and second portions of the electrically conductive braid and the sleeve. Such connection may include windings, similar to the windings heretofore described with respect to the connection of the electrically conductive braid to the end member, as well as to the ferrule underlying the electrically conductive braid.

It may be apparent that a novel and useful system for grounding a fiberscope has been hereinabove described.

It is therefore an object of the present invention to provide a grounding system for a fiberscope which prevents electrical discharge at the fiberscope when the same is used in confined spaces.

Another object of the present invention is to provide a grounding system for a fiberscope having a metallic braid component which eliminates soldering as a means for connecting the braid material to other portions of the fiberscope.

A further object of the present invention is to provide a grounding system for a fiberscope which utilizes a metallic braid sheath to protect the tube containing the fiber optic bundles which is resistant to tearing and is grounded with other portions of the fiber scope.

Another object of the present invention is to provide a grounding system for a fiberscope which greatly increases the safety in the use of the fiberscope, especially where the fiberscope is used in spaces containing flammable materials.

Yet another object of the present invention is to provide a grounding system for a fiberscope which includes a grounding connection that is readily available for use.

Another object of the present invention is to provide a grounding system for a fiberscope which prevents the possibility of an explosion by the generation of static electricity by materials such as gasoline within a gas tank.

Another object of the present invention is to provide a grounding system for a fiberscope which permits the safe operation of the fiberscope in a variety of situations.

The invention possesses other objects and advantages especially as concerns particular characteristics and features thereof which will become apparent as the specification continues.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be understood when referenced to the prior delineated drawings.

Figure 1:
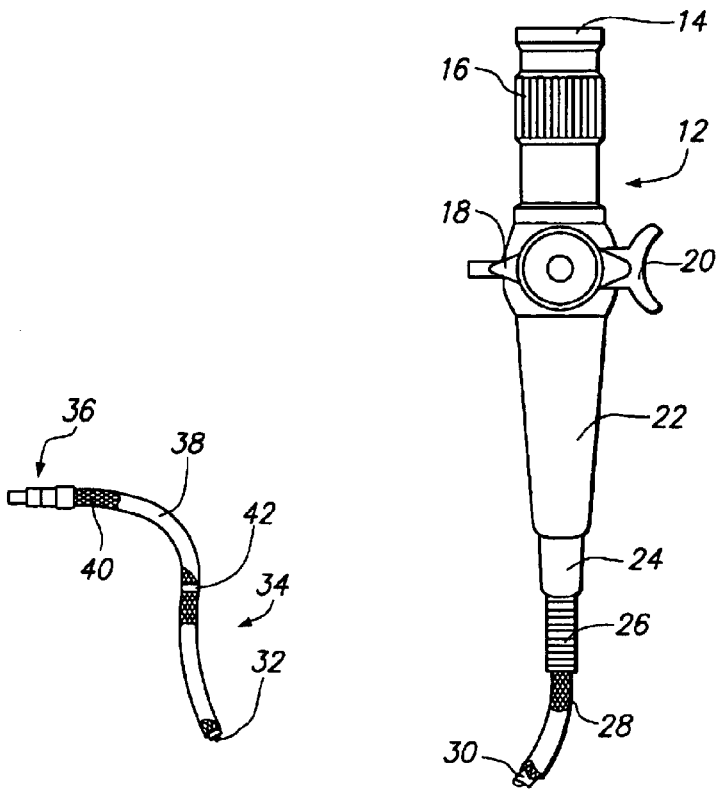
FIG. 1 is a side elevational view of a fiberscope employed with the system of the present invention, the flexible portion illustrated in broken configuration.

The preferred embodiment of the invention as a whole is shown in the drawings by reference character 10. Grounding system 10 is intended to be employed with a fiberscope 12 depicted in FIG. 1 without the invention of the present application. Fiberscope 12 includes a eyepiece 14 which is optically controlled by focusing ring 16. Control levers 18 and 20 are employed to adjust the image and eyepiece in an up-down or right-left direction. Metallic housing 22 terminates in a cover 24. Generally, housing 22 is formed into the shape of a hollow truncated cone. Coil 26 overlies metallic braid 28 which is employed to protect flexible tube 30. Fiberoptic bundles 32 lie within flexible tube 30. In general, metallic braid 28 tube 30, and fiberoptic bundles 32 define flexible portion 34 of fiberscope 12. Tip 36 serves as the terminus for fiber optic bundles 32 which receives electromagnetic radiation that produces an image viewable at eyepiece 14. Articulating section 38 is again enclosed by metallic braid 40 and is separated from metallic braid 28 by wrist section 42. It should be noted that metallic braids 28 and 40 are generally formed of a tough material such as tungsten, which is generally preferred over stainless steel since it is less likely to fray. Such fraying may cause damage to the item being inspected or injure persons operating fiberscope 12. However, it has been found that tungsten braid is very difficult to solder. Such soldering is even more difficult when tungsten is intended to be connected with a dissimilar metal.

Figure 2:
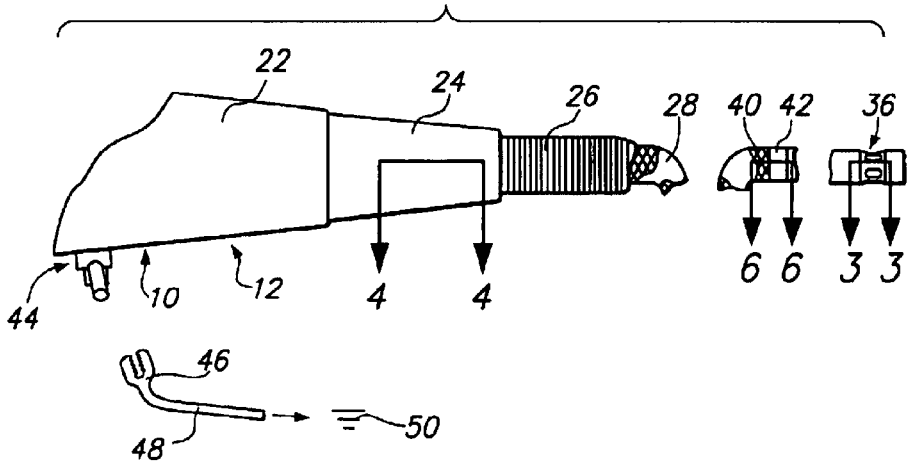
FIG. 2 is a partial broken side elevational view of a fiberscope employing the invention of the present application.

Turning to FIG. 2, it may be observed that fiberscope 12 has been fitted with a grounding fixture 44 which is located at housing 22. Grounding fixture 44 may be employed with alligator clip 46 appending from conductor 48 which eventually passes to ground 50, shown schematically in FIG. 2.

Figure 3:
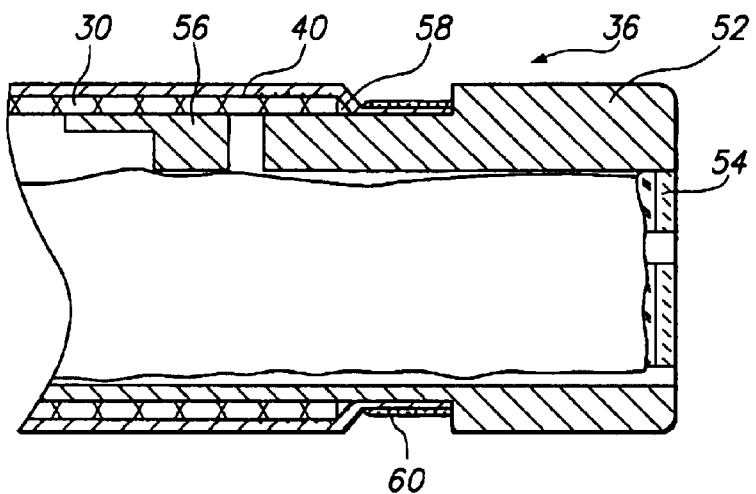
FIG. 3 is a sectional view taken along line 3—3 of FIG. 2.
Figure 4:
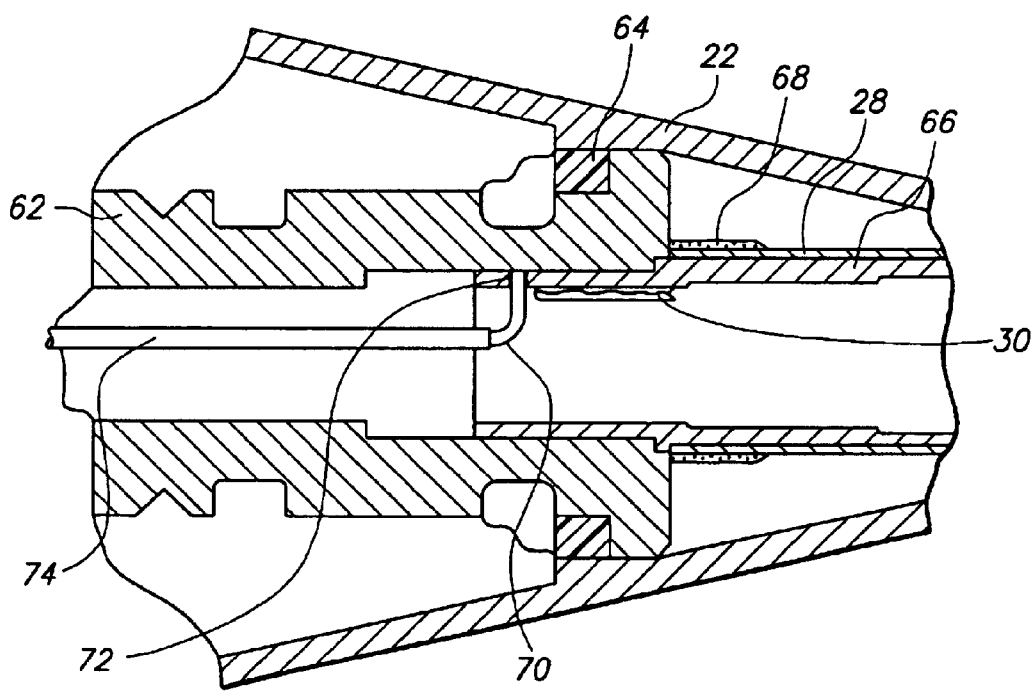
FIG. 4 is a sectional view taken along line 4—4 of FIG. 2.

With respect to FIG. 3 it may be apparent that tip or head 36 is shown in which electrical conductive member 52, in the form of an open cap or bushing, forms a portion of the image bundle end 54, generally in surrounding relationship with the same. Tungsten braid 40 surrounds flexible helicoil tube 42 which lies over support structure 56. Tungsten braid 40 overlies tube 30 and enters a recess 58 to mechanically and electrically contact open cap member 52. Non-electrically conductive, polymeric binding, or wrap, 60 securely holds tungsten braid 40 to member 52 in this position. In certain cases, tungsten braid 40 will extend to housing 22 which is typically constructed of metallic material for the sake of strength and durability. In other cases, wrist portion 42 interrupts metallic braid 40 such that metallic braid 28 and metallic braid 40 are discontinuous, which will be discussed in greater detail hereafter. In any case, metallic braid 28 within housing 22 is shown on FIG. 4. Collar 62 lies within housing 22 and connects thereto via circular boss 64. A metallic ferrule 66 underlies housing 22 and metallic braid 28 within housing 22. Ferrule 30 overlies flexible tubing 30, shown partially in FIG. 4. Details of the fiber optic bundle and metallic helicoil tube 30 have been omitted in FIG. 4 for the sake of clarity in the system 10 of the present invention. Polymeric wrapping or bundle 68 overlies metallic braid 28 and ferrule 66 to hold metallic braid 28 mechanically and electrically to ferrule 66. It should be noted that collar 66 also electrically connects housing 22 to ferrule 66. Thus, housing 22, cover 24, and coil 66 are all electrically linked to ferrule 66, along with metallic braid 28. Wire conductor 70 is soldered to ferrule 66 which is normally formed of steel, copper or other material which is easily soldered. Insulator 74 covers a large portion of conductor 70 within housing 22.

Figure 5:
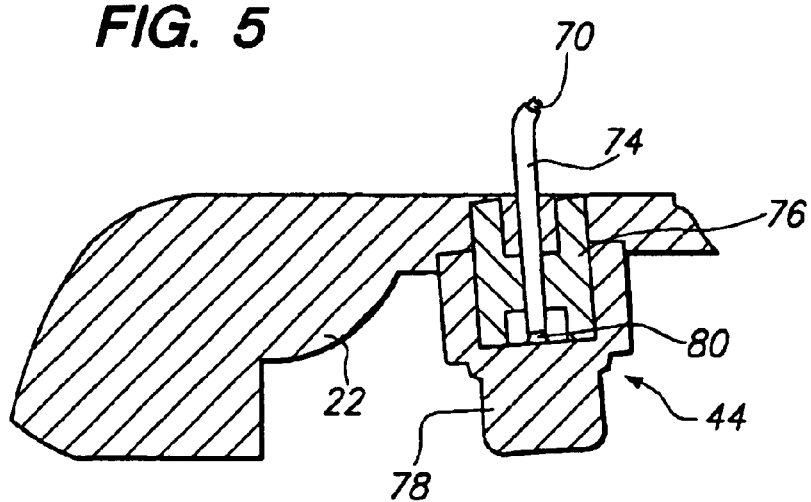
FIG. 5 is a sectional view of the terminus of the conductor shown in elevation on FIG. 2.

Turning to FIG. 5, it may be observed that conductor 70 within insulated cover 74 travels to ground fixture 44 within cover 22. Positioner 76 holds conductor 70 within insulted cover 74 in order to contact button 78 which is easily accessible at the exterior of housing 22. Conductor 70 is electrically and mechanically fixed to button 78 by soldering, fasteners, and the like. Solder points 80 are depicted in FIG. 5 as being typical of such connection.

Figure 6:
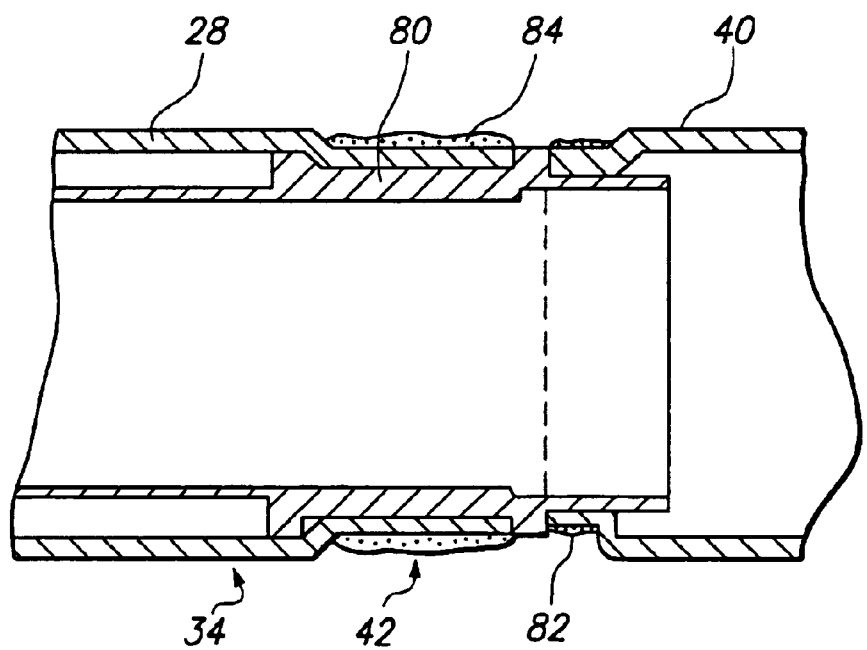
FIG. 6 is a sectional view taken along line 6—6 of FIG. 2.

Viewing now FIG. 6, it may be observed that tungsten braid 28 is shown at wrist section 42 of flexible portion 34 of fiberscope 12. Metallic sleeve 80 is employed with metallic braids 28 and 40 in that sleeve 80 underlies metallic braids 28 and 40. Polymeric winding 82 overlies metallic braid 40 and metallic sleeve 80 while metallic braid 84 overlies metallic braid 28 and sleeve 80. Thus, a continuous electrical link is effected between metallic braid 28 and metallic braid 40 at wrist portion or wrist joint 42.

In operation, the user operates fiberscope 12 in its conventional operating mode. Fiberscope 12 may take the form of an FO-10 or FO-20 distributed by Campbell Security Equipment Co. of Pleasant Hill, Calif. The addition of system 10 to fiberscope 12 permits the user to ground fiberscope 12 in its entirety by the use of ground fixture 44 which is linked to ground 50 by any suitable means such as alligator clip 46 and conductor 48. Tungsten braid portions 26 and 40 are electrically linked to one another throughout fiberscope 12 in addition to housing 22, cover 24, and coil 26. In addition, tip or head 36 of fiber optic bundle is also electrically linked to tungsten braids 28 and 40 such that conductor 70 electrically connects to button 78 for use by operators of fiberscope 12. The use of system 10 reduces, to an immense degree, the possibility of explosion or fire when fiberscope 12 is employed in environments containing volatile constituents, such as the gas tank of a vehicle.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A grounding system for a fiberscope having a relatively rigid electrically conductive housing, an image bundle end, and a flexible hollow tube therebetween, comprising:
   a. a electrically conductive braid surrounding at least a portion of the flexible hollow tube;
   b. a electrically conductive member forming a portion of the image bundle end in surrounding relationship;
   c. means for electrically connecting said electrically conductive braid to said electrically conductive member;
   d. an electrically conductive ferrule underlying and electrically connected to the electrically conductive housing;

e. means for electrically connecting said electrically conductive braid to said electrically conductive ferrule; and f. a conductor having a first end portion and a second end portion, said first end portion electrically connected to said electrically conductive ferrule, said conductor extending from said electrically conductive ferrule, said second end portion of said conductor extending to the electrically conductive housing for access.

2. The system of claim 1 which additionally comprises a protuberance extending outwardly from the electrically conductive housing, said protuberance supporting said second end portion of said conductor.

3. The system of claim 1 in which said electrically conductive member comprises a metallic bushing.

4. The system of claim 1 in which said means for electrically connecting said electrically conductive braid to said electrically conductive member comprises a first winding positioned about said electrically conductive braid, said electrically conductive braid overlying said electrically conductive member.

5. The system of claim 1 which said means for electrically connecting said electrically conductive member to said electrically conducting ferrule comprises a second winding positioned about said electrically conductive braid, said electrically conductive braid overlying said electrically conductive ferrule.

6. The system of claim 5 in which said means for electrically connecting said electrically conductive braid to said electrically conductive member comprises a first winding positioned about said electrically conductive braid, said electrically conductive braid overlying said electrically conductive member.

7. The system of claim 1 in which said electrically conductive braid includes a first portion and a second portion separated therefrom, an electrically conductive sleeve underlying said separated first and second portion of said electrically conductive braid, and means for electrically connecting said first and second portions of said electrically conductive braid to said underlying electrically conductive sleeve.

8. The system of claim 7 in which said means for electrically connecting said first and second portions of said electrically conductive braid to said underlying electrically conductive sleeve comprises at least a third winding positioned about said electrically conductive braid.

9. The system of claim 8 which additionally comprises a protuberance extending outwardly from the electrically conductive housing, said protuberance supporting said second end portion of said conductor.

10. The system of claim 8 in which said electrically conductive member comprises a metallic bushing.

11. The system of claim 8 in which said means for electrically connecting said electrically conductive braid to said electrically conductive member comprises a first winding positioned about said electrically conductive braid, said electrically conductive braid overlying said electrically conductive member.

12. The system of claim 8 which said means for electrically connecting said electrically conductive member to said electrically conducting ferrule comprises a second winding positioned about said electrically conductive braid, said electrically conductive braid overlying said electrically conductive ferrule.

13. The system of claim 12 in which said means for electrically connecting said electrically conductive braid to said electrically conductive member comprises a first winding positioned about said electrically conductive braid, said electrically conductive braid overlying said electrically conductive member.

14. The system of claim 13 in which said means for electrically connecting said first and second portions of said electrically conductive braid to said underlying electrically conductive sleeve comprises at least a third winding positioned about said electrically conductive braid.

* * * * *